3,775,472
OXIDATION OF ALKYL AROMATIC COMPOUNDS
Stephen N. Massie, Palatine, Ill., assignor to Universal Oil Products Company, Des Plaines, Ill.
No Drawing. Filed Dec. 28, 1970, Ser. No. 102,055
Int. Cl. C07c 63/06, 63/14, 63/32
U.S. Cl. 260—524 R                 9 Claims

ABSTRACT OF THE DISCLOSURE

Alkyl aromatic compounds, and particularly alkyl aromatic hydrocarbons, are oxidized by treating with an oxygen-containing gas in the presence of a catalyst comprising a ruthenium-containing compound to form oxygenated aromatic compounds.

---

This invention relates to a process for preparing oxygenated aromatic compounds by treating an alkyl aromatic compound with an oxygen-containing gas in the presence of certain catalytic compositions of matter of a type hereinafter set forth in greater detail.

Oxygenated aromatic compounds constitute an important class of chemical compounds which are useful for a variety of purposes. For example, benzaldehyde is useful in organic synthesis, especially for dyes and dye intermediates. In addition it is also useful as a solvent for oils, resins, some cellulose ethers, cellulose acetate and cellulose nitrate. Other uses for this compound will include use in flavoring compounds, in the production of synthetic perfumes, in the manufacture of cinnamic acid, in toilet preparations and soaps, in photographic chemicals, in baking chemicals and in medicine. Benzoic acid which is another oxidation product prepared by the process of this invention is used as a mordant in calico printing, it is also used in seasoning tobacco and improving the aroma, in flavoring perfumes, in dentifrices in medicines as a germacide, in textiles, in dye, as a plasticizer and resin intermediate, etc. Another product of the process of this invention comprises benzyl alcohol which is used as a solvent in perfumery and flavoring materials, as an intermediate in preparing other benzyl esters and ethers, as a high boiling solvent in cellulose derivatives production and also as a solvent for cellulose esters and ethers. Another use for this compound includes the use in resins, lacquer, films and in paint and varnish removers.

It is therefore an object of this invention to provide a process for the oxidation of alkyl substituted aromatic compounds.

A further object of this invention is to provide a process for preparing oxygenated aromatic compounds utilizing alkyl substituted aromatic hydrocarbons as the starting material.

In one aspect an embodiment of this invention resides in a process for the oxidation of an alkyl substituted aromatic hydrocarbon which comprises treating said alkyl substituted aromatic hydrocarbon with an oxygen-containing gas in the presence of a catalyst comprising a ruthenium containing compound at oxidation conditions, and recovering the resultant oxygenated aromatic compound.

A specific embodiment of this invention resides in a process for the preparation of an oxygenated aromatic compound which comprises treating toluene with air in the presence of a catalyst comprising ruthenium composited on alumina at a temperature in the range of from about 100° to about 250° C. and a pressure in the range of from atmospheric to about 100 atmospheres, and recovering the resultant benzyl alcohol, benzaldehyde, and benzoic acid.

Other objects and embodiments will be found in the following further detailed description of the present invention.

As hereinbefore set forth, the present invention is concerned with a process for the oxygenation of alkyl substituted aromatic compounds, and particularly alkyl substituted aromatic hydrocarbons to prepare the corresponding first, second, and third stage oxygenation products, namely, the corresponding alcohols, aldehydes, and acids. The desired oxygenation is effected in the presence of certain catalytic compositions of matter comprising ruthenium-containing compounds. That the use of a ruthenium-containing compound as a catalyst in the oxidation of an alkyl substituted aromatic hydrocarbon would be effective is unexpected in view of the fact that other noble metals of Group VIII of the Periodic Table are ineffective oxidation catalysts for such aromatic compounds. Examples of alkyl substituted aromatic compounds which may undergo oxidation to form the corresponding alcohols, aldehydes and acids will include both mono- and polyalkyl substituted aromatic hydrocarbons such as toluene, ethylbenzene, n-propylbenzene, n-butylbenzene, n-amylbenzene, o-xylene, m-xylene, p-xylene, o-diethylbenzene, m-diethylbenzene, p-diethylbenzene, o-dipropylbenzene, m-dipropylbenzene, p-dipropylbenzene, mesitylene, pseudocumene, hemimellitene, durene, isodurene prehnitene, pentamethylbenzene, hexamethylbenzene, etc., 1-methylnaphthalene, 2-methylnaphthalene, 1-ethylnaphthalene, 2-ethylnaphthalene, 1-n-propylnaphthalene, 2-n-propylnaphthalene, 1-methylanthracene, 2-methylanthracene, 1-ethylanthracene, 2-ethylanthracene, etc. It is to be understood that the aforementioned alkyl substituted aromatic hydrocarbons are only representative of the class of compounds which may be utilized as a starting material, and that the present invention is not necessarily limited thereto.

Oxidation reaction conditions under which the process of the present invention is effected will include elevated temperatures, preferably in a range of from about 100° to about 250° C. and a pressure ranging from atmospheric up to about 100 atmospheres or more. The oxidation agent which is utilized to prepare the desired product will comprise an oxygen-containing gas such as air or oxygen, the former constituting the preferred oxidation agent due to the greater availability and lower cost.

As hereinbefore set forth, the oxidation reaction is effected in the presence of a catalyst comprising a ruthenium-containing compound. The ruthenium-containing compound will comprise a catalyst which may be heterogeneous or homogeneous with respect to the alkyl substituted aromatic hydrocarbon undergoing oxygenation. Some specific examples of these heterogeneous ruthenium-containing compounds will include ruthenium composited on a solid support such as ruthenium composited on alumina, ruthenium composited on silica, ruthenium composited on pumice, ruthenium composited on a mixture of metal oxides such as ruthenium composited on silica-alumina, ruthenium composited on silica-alumina-zirconia, ruthenium composited on silica-magnesia-zirconia, etc. Salts of ruthenium which may be used include ruthenium trichloride, ruthenium tetrachloride, ruthenium nitrate, ruthenium dioxide, ruthenium tetroxide, ruthenium tribromide, ruthenium triiodide, ruthenium sulfate, etc., may remain heterogeneous or may react with the carboxylic acid product to form a homogeneous catalyst. Ruthenium acetate, ruthenium propionate, ruthenium butyrate, ruthenium benzoate, ruthenium toluate, etc., may be homogeneous or heterogeneous catalysts depending on the oxidation conditions. It is to be understood that the aforementioned ruthenium-containing compounds are only representative of the class of compounds which may be used, and that the present invention is not necessarily limited thereto.

The process of this invention may be effected in any suitable manner and may comprise either a batch or continuous type operation. For example, when a batch type operation is used, a quantity of the alkyl substituted aromatic hydrocarbon and the ruthenium-containing catalyst are placed in an appropriate apparatus which may comprise a flask provided with the necessary heating and oxygen-containing gas charging means or, if superatmospheric pressures are to be employed, an autoclave of the rotating or mixing type. Following this, the oxidation agent comprising the oxygen-containing gas is charged to the reactor which is thereafter heated to the desired operating temperature. Upon completion of the predetermined residence time, which may range from about 0.5 up to about 20 hours or more in duration, heating is discontinued, the apparatus is allowed to return to room temperature, if at superatmospheric pressure, the excess pressure is discharged. The reaction mixture is recovered from the apparatus, separated from the catalyst and subjected to conventional means of purification which will include washing, drying, fractional distillation, extraction, etc., whereby the desired oxygenation products comprise alcohols, aldehydes and/or acids are recovered and separated.

It is also contemplated within the scope of this invention that the process may be effected in a continuous manner of operation. When such a type of operation is used, the alkyl substituted aromatic hydrocarbon is continuously charged to the reaction vessel containing the catalyst which is maintained at the proper operating conditions of temperature and pressure. In addition, the oxidation agent comprising an oxygen-containing gas such as air or oxygen is also charged to the reactor through separate means. Upon completion of the desired residence time, the reactor effluent is continuously discharged and subjected to separation means of the type hereinbefore set forth whereby the desired oxygenated products comprising aromatic alcohols, acids, and aldehydes are recovered, while any unreacted starting materials may be recycled to the reaction zone to form a portion of the feed stock. If the catalyst is heterogeneous in nature with respect to the reactant, it is possible to effect a continuous type of operation in various ways. One such type of operation which may be employed comprises the fixed bed type of operation in which the catalyst is disposed as a fixed bed in the reaction zone and the reactant is passed through said zone in either an upward or downward flow. Another type which may be employed comprises the moving bed system in which the catalyst and the reactant pass through the reaction zone either concurrently or countercurrently to each other. Yet another type of operation which may be used comprises the slurry type in which the catalyst is carried into the reaction zone as a slurry in the alkyl substituted aromatic hydrocarbon.

The following examples are given to illustrate the process of the present invention which, however, are not intended to limit the generally broad scope of the present invention in strict accordance therewith.

EXAMPLE I

A charge stock comprising 60 g. of toluene was placed in the glass liner of a rotating autoclave which contained 4 g. of a catalyst comprising ruthenium composited on alumina. The autoclave was sealed and air pressed in until an initial pressure of 35 atmospheres was reached. The autoclave was then heated to a temperature of 180° C. and maintained thereat for a period of 16 hours, the maximum at this pressure reaching 63 atmospheres. At the end of the 16 hours, heating was discontinued and the autoclave allowed to return to room temperature, the final pressure at room temperature being 30 atmospheres. The autoclave was opened and the reaction mixture was recovered therefrom. Analysis by means of a gas-liquid chromatograph disclosed the presence of 39 mmols of benzyl alcohol, 42 mmols of benzaldehyde, and 167 mmols of benzoic acid formed per mol of oxygen charged thereto.

EXAMPLE II

In this example 60 g. of ethylbenzene is charged to the glass liner of a rotating autoclave which contains 2 g. of a catalyst consisting of ruthenium trichloride. The autoclave is sealed and air is pressed in until an initial pressure of 35 atmospheres is reached. Thereafter the autoclave is heated to a temperature of 180° C. and maintained thereat for a period of 16 hours. During the reaction period, the maximum pressure will reach about 60 atmospheres. At the end of the heating period heating is discontinued, the autoclave is allowed to return to room temperature, the excess pressure is discharged and the autoclave is opened. The reaction mixture is recovered therefrom, separated from the catalyst and subjected to a gas-liquid chromatographic analysis, said analysis discloses the presence of α-methylbenzyl alcohol, acetophenone, and benzoic acid, the latter compound being the predominant product.

EXAMPLE III

A charge comprising 60 g. of p-xylene and 4 g. of a catalyst comprising ruthenium composited on alumina is placed in the glass liner of a rotating autoclave. Thereafter the autoclave is sealed and air pressed in until the desired initial operating pressure of 35 atmospheres is reached. Following this, the autoclave is then heated to a temperature of 180° C. and maintained thereat for a period of 16 hours. During this 16 hour period, the maximum pressure in the autoclave will rise to about 60 atmospheres. At the end of 16 hours, heating is discontinued and the autoclave allowed to return to room temperature, the final pressure at room temperature being about 30 atmospheres. After returning to room temperature, the excess pressure is discharged, the autoclave is opened and the reaction mixture is recovered therefrom. After separation from the catalyst, the mixture is analyzed by means of a gas-liquid chromatograph, said analysis disclosing the presence of 4-methylbenzyl alcohol, 4-methylbenzaldehyde, 4-methylbenzoic acid and 1,4-benzenedicarboxylic acid.

EXAMPLE IV

In this example, 60 g. of mesitylene and 2 g. of ruthenium trichloride are placed in the glass liner of a rotating autoclave which is thereafter sealed. Oxygen is then pressed into the autoclave until an initial operating pressure of 25 atmospheres is reached, and the autoclave is thereafter heated to a temperature of 200° C. After maintaining the autoclave and contents thereof at this temperature for a period of 16 hours, during which time the maximum pressure will reach about 60 atmospheres, heating is discontinued and the autoclave is allowed to return to room temperature. The excess pressure is then discharged, the autoclave is opened, the reaction mixture is recovered and separated from the catalyst. Analysis of this reaction mixture by means of gas-liquid chromatograph will disclose the presence of 3,5-dimethylbenzyl alcohol, 3,5-dimethylbenzaldehyde, 3,5-dimethylbenzoic acid, 5-methyl-1,3-benzenedicarboxylic acid and 1,3,5-benzenetricarboxylic acid.

I claim as my invention:

1. A process for the oxidation of an alkyl substituted aromatic hydrocarbon which comprises treating said alkyl substituted aromatic hydrocarbon with an oxygen-containing gas in the presence of a ruthenium-containing compound at oxidation conditions including a temperature in the range of from about 100° to about 250° C. and a pressure in the range of from about atmospheric to about 100 amospheres, and recovering the resultant oxygenated aromatic compound.

2. The process as set forth in claim 1 in which said oxygen-containing gas is oxygen.

3. The process as set forth in claim 1 in which said oxygen-containing gas is air.

4. The process as set forth in claim 1 in which said ruthenium-containing compound is composited on alumina.

5. The process as set forth in claim 1 in which said ruthenium-containing compound is ruthenium chloride.

6. The process as set forth in claim 1 in which said alkyl substituted aromatic hydrocarbon is toluene and said oxygenated aromatic compounds are benzyl alcohol, benzaldehyde, and benzoic acid.

7. The process as set forth in claim 1 in which said alkyl substituted aromatic hydrocarbon is ethylbenzene and said oxygenated aromatic compounds are α-methylbenzyl alcohol, acetophenone, and benzoic acid.

8. The process as set forth in claim 1 in which said alkyl substituted aromatic hydrocarbon is p-xylene and said oxygenated aromatic compounds are 4-methylbenzyl alcohol, 4-methylbenzaldehyde, 4-methylbenzoic acid and 1,4-benzenedicarboxylic acid.

9. The process as set forth in claim 1 in which said alkyl substituted aromatic hydrocarbon is mesitylene and said oxygenated aromatic compounds are 3,5-dimethylbenzyl alcohol, 3,5-dimethylbenzaldehyde, 3,5-dimethylbenzoic acid, 5-methyl-1,3-benzenedicarboxylic acid and 1,3,5-benzenetricarboxylic acid.

References Cited
UNITED STATES PATENTS

| | | | |
|---|---|---|---|
| 2,289,036 | 7/1942 | Parks et al. | 260—524 |
| 3,479,403 | 11/1969 | MacLean | 260—524 |
| 3,505,397 | 4/1970 | Patton et al. | 260—524 |

LORRAINE A. WEINBERGER, Primary Examiner

P. J. KILLOS, Assistant Examiner

U.S. Cl. X.R.

260—592, 599, 618 C